(No Model.) 2 Sheets—Sheet 1.

W. P. ABENDROTH.
COOKING ATTACHMENT FOR RANGES.

No. 370,228. Patented Sept. 20, 1887.

Attest:
Geo. H. Botts.
Fred R. Carragan

Inventor:
Wm. P. Abendroth
By Ernest Webb
Atty.

(No Model.) 2 Sheets—Sheet 2.
W. P. ABENDROTH.
COOKING ATTACHMENT FOR RANGES.
No. 370,228. Patented Sept. 20, 1887.
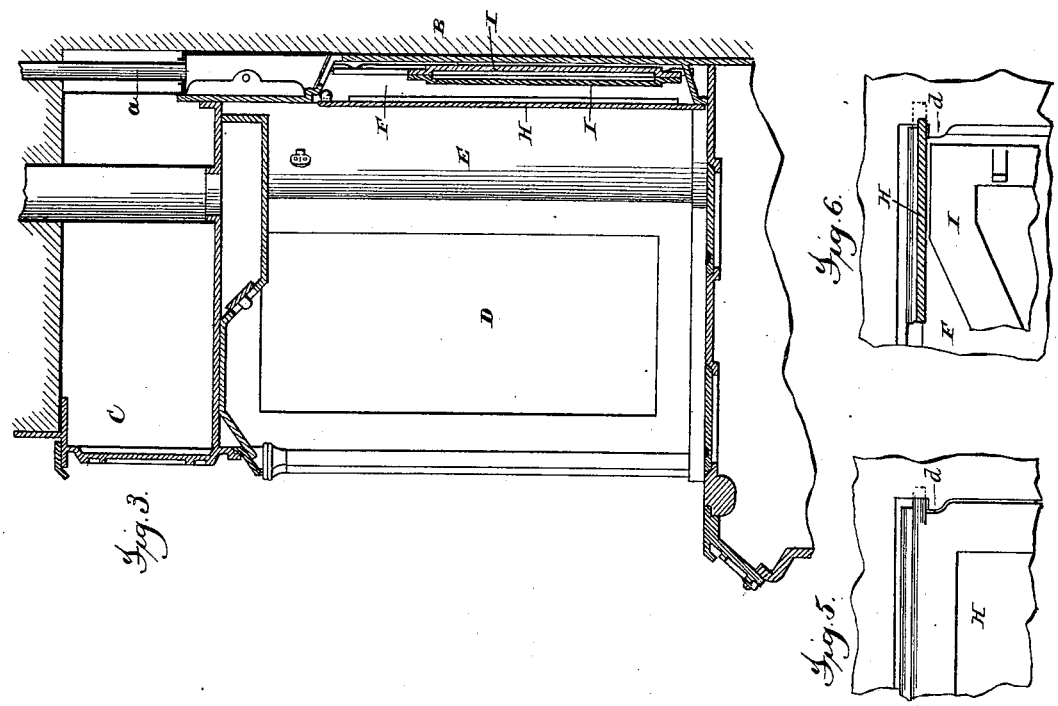
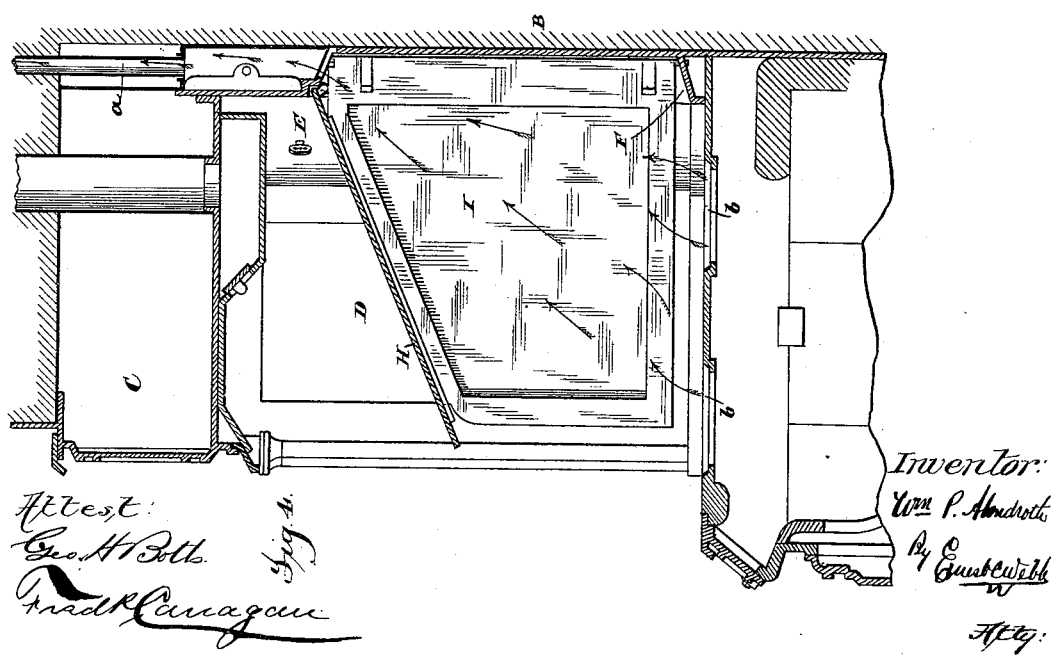

UNITED STATES PATENT OFFICE.

WILLIAM P. ABENDROTH, OF PORT CHESTER, NEW YORK.

COOKING ATTACHMENT FOR RANGES.

SPECIFICATION forming part of Letters Patent No. 370,228, dated September 20, 1887.

Application filed December 17, 1886. Serial No. 221,831. (No model.)

*To all whom it may concern:*

Be it known that I, WILLIAM P. ABENDROTH, a citizen of the United States, residing at Port Chester, in the county of Westchester and State of New York, have invented certain new and useful Improvements in Cooking Attachments for Ranges, of which the following is a full, clear, and exact description.

My invention relates to certain improvements in cooking-ranges, and particularly to a portable cooking attachment by which the fumes and smoke from cooking will be directed into the smoke-flue of the chimney.

The invention consists in the details of construction, substantially as hereinafter particularly set forth and claimed.

Figure 1:
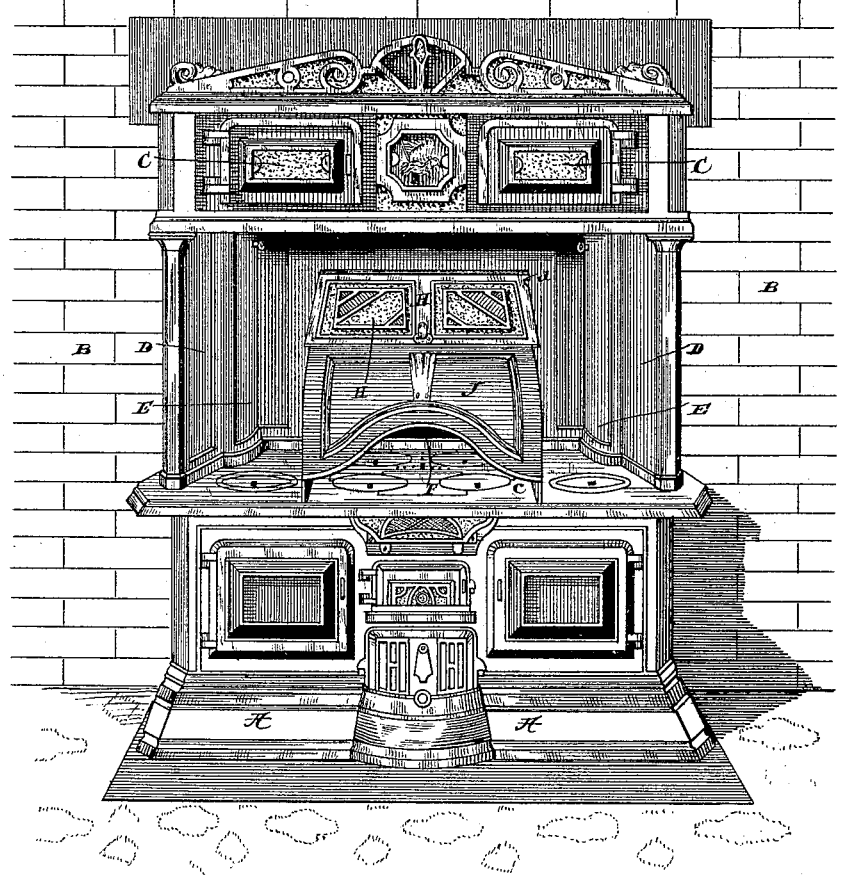
Figure 2:
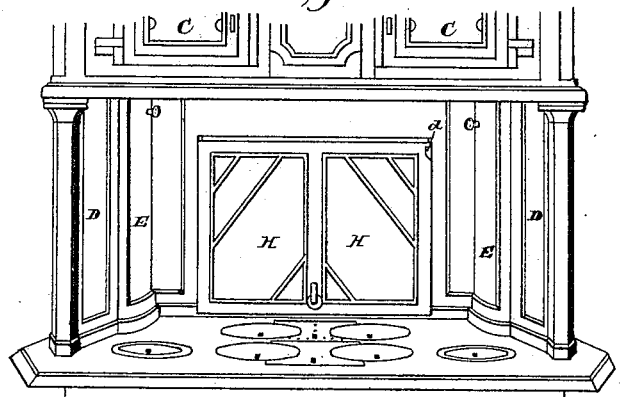

In the accompanying drawings, in the several figures of which like parts are designated by similar letters of reference, Figure 1 is a perspective view of a range embodying my improvements, illustrating the cooking attachment in position for use. Fig. 2 is a front view of the upper part of the range, illustrating the position of the cooking attachment when closed. Fig. 3 is a transversely-central vertical section through the upper part of the range with the cooking attachment closed, and Fig. 4 is a similar view with the cooking attachment open. Figs. 5 and 6 are details.

A is the cooking-range, B the brick wall, and C the elevated warming-closets. Between the range-top proper and the warming-closets the entire surface of the brick wall is covered with a cast or wrought iron front, D, having tubular parts E to form the pipes. A space or draft-box, F, is provided between the back of the cast-metal front and the brick wall, and this draft-box is connected by a pipe, $a$, (or otherwise,) with the chimney.

The cooking attachment, when made as part of the range, is composed of the vertically-swinging top H, laterally-swinging sides I I, and a removable blower, J. As shown in the drawings, the top and sides of the cooking attachment are of a size to project forward from the rear almost to the front of the range-top proper and wide enough to inclose or cover four stove-holes, $b$.

The height of the cooking attachment may vary; but I prefer to make it high enough to permit kettles of the ordinary size in common use to be placed under it. The front or blower J is preferably entirely detachable, and is cut away, as shown at $c$, to answer the double purpose of creating a draft through the hood and permitting a broiler, fry-pan, or other cooking utensil to be conveniently manipulated in cooking without necessitating the removal of the blower.

When not in use, the cooking attachment can be closed by removing the blower, folding the sides into the draft-box F, and letting down the top to cover the opening. The position of the folding parts of the cooking attachment when closed is shown by Figs. 2 and 3.

When it is desired to use the attachment, it is only necessary to raise the top, swing out the sides, and place the front or blower in position. When the parts are in this position, as shown in Figs. 1 and 4, they form a hood having a central opening at the front and communicating at the rear with the smoke-flue of the chimney; hence it is obvious that the fumes, steam, and smoke arising during the cooking operations will be carried directly into the chimney, and will not rise into the room.

In order to support the swinging top H, if desired, while the sides are being folded outwardly, I make the pins on which it swings and the bearings therefor of sufficient length to permit the adjustment of the top laterally, so that one edge of the top can be slid over a lug, $d$, on the metal wall.

It is obvious that the cast or wrought iron wall and the top H of the cooking attachment may be ornamented, so as to render the range more attractive and pleasing to the eye.

The space F, when containing the folded-in cooking attachment and closed by the top H of such cooking attachment, may subserve no other purpose than a closet for such dismantled cooking attachment; but when the cooking attachment is extended for use then this space acts as a draft-box, which is in open communication with the chimney and said cooking attachment, and conveys away all the vapors, smoke, &c. Moreover, when the cooking attachment is folded in in said space F the back of the range presents an unbroken ornamental surface.

What I claim as my invention, and desire to secure by Letters Patent, is—

1. The combination, with a range having the space or recess F, of a cooking attachment comprising a vertically-swinging top and laterally-swinging sides sustained on hinged bearings in the said space, and the detachable front, substantially as described.

2. The combination, with a range having a draft-box, F, connected with the chimney, of a cooking attachment comprising the vertically-swinging top, laterally-swinging sides, and a detachable front provided with a central opening, whereby when the cooking attachment is in position for use a draft is created through it to the chimney, substantially as described.

3. In a range, the range-top proper and the elevated warming-closets having intermediate brick-work, combined with the metal front D, covering such brick-work between the range-top and closets, and having tubular portions E to form the pipes, substantially as described.

In testimony whereof I have hereunto set my hand this 6th day of December, A. D. 1886.

WM. P. ABENDROTH.

Witnesses:
FRANK A. ABENDROTH,
ERNEST C. WEBB.